Dec. 13, 1932.    B. A. KABELE    1,891,163
FISHING ROD HOLDER
Filed May 24, 1932    2 Sheets-Sheet 1
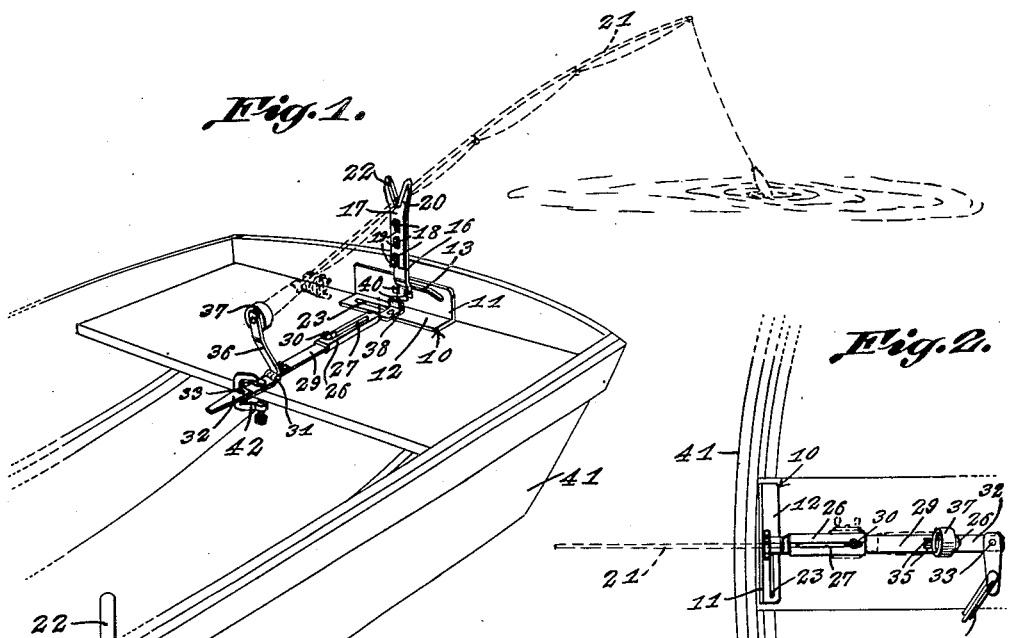
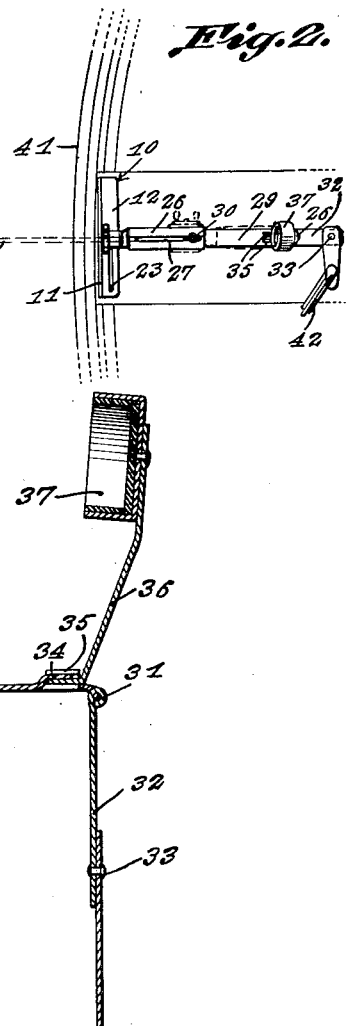
B. A. Kabele, INVENTOR
BY Victor J. Evans & Co.
ATTORNEY Dec. 13, 1932.    B. A. KABELE    1,891,163
FISHING ROD HOLDER
Filed May 24, 1932    2 Sheets-Sheet 2
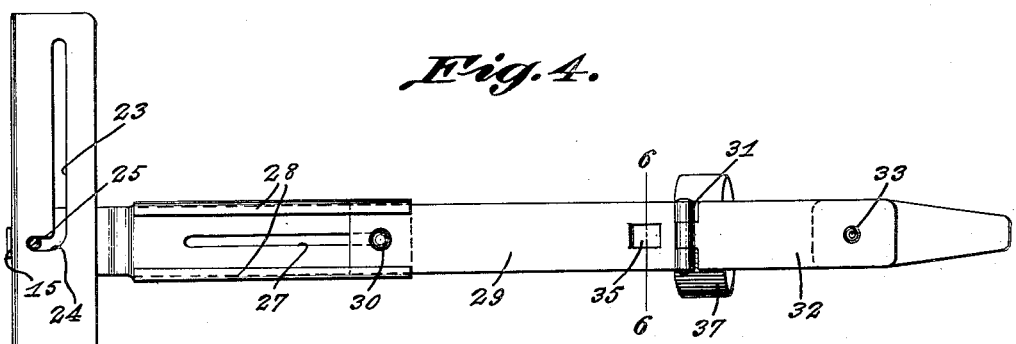
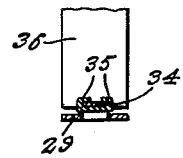
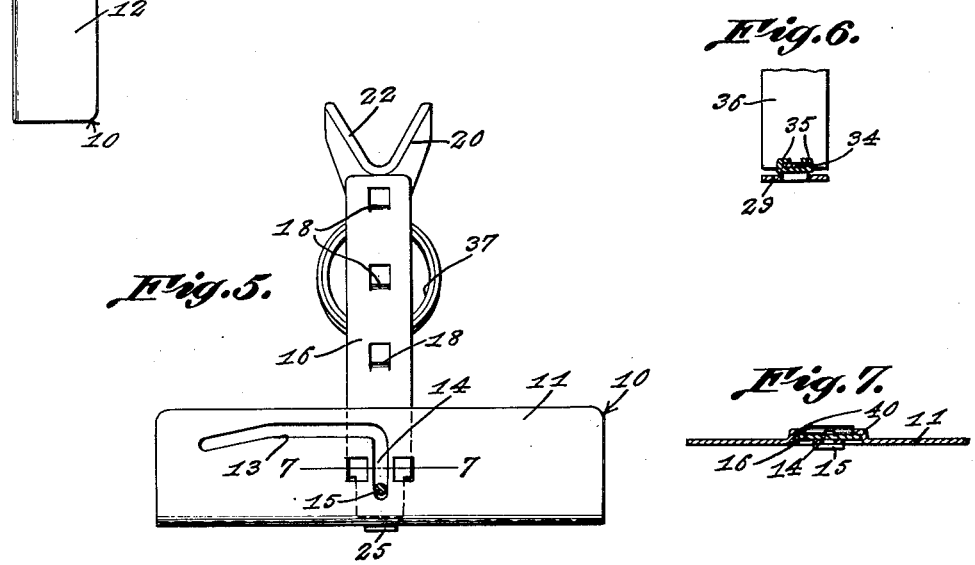
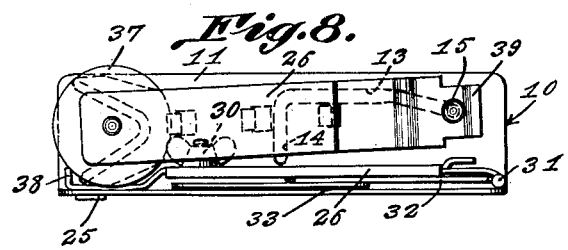
B. A. Kabele, INVENTOR
BY Victor J. Evans & Co.
ATTORNEY Patented Dec. 13, 1932

1,891,163

UNITED STATES PATENT OFFICE

BENEDICT ARTHUR KABELE, OF SCHENECTADY, NEW YORK

FISHING ROD HOLDER

Application filed May 24, 1932. Serial No. 613,282.

The invention relates to a fishing rod holder and more particularly to a foldable fishing rod holder.

The primary object of the invention is the provision of a holder of this character, wherein the same can be set up for use either at the stern end or side of a boat and will firmly hold a fishing rod when trolling, thus obviating the necessity of a fisherman holding the rod in the hand or hands and thereby relieving said fisherman from this labor or duty, the holder being also adaptable for anchorage in a bank at a water edge and when the fishing rod is therein will securely and firmly hold the same without liability of the said rod becoming detached or pulling therefrom when a fish is caught by the line on the rod.

Another object of the invention is the provision of a holder of this character, wherein the construction thereof is novel in form so that when not in use it can be readily folded into compact form with dispatch to occupy the least possible space and to enable the convenient and easy carriage thereof, and also may be set up for use for the firm holding of a fishing rod either within a boat or upon land.

A further object of the invention is the provision of a holder of this character wherein it is readily adjustable to accommodate fishing rods of different lengths and to assure the firm retention of the rod in the holding thereof, thus relieving the fisherman from this task by holding such rod in the hand.

A still further object of the invention is the provision of a holder of this character, which is extremely simple in construction, thoroughly reliable and efficient in its purpose, strong, durable, readily foldable and unfoldable, capable of being set up for use with dispatch, and inexpensive to manufacture.

With these and other objects in view, the invention consists in the features of construction, combination and arrangement of parts as will be hereinafter more fully described in detail, illustrated in the accompanying drawings, which disclose the preferred embodiment of the invention, and pointed out in the claims hereunto appended.

In the accompanying drawings:—

Figure 1 is a fragmentary perspective view of a boat showing the rod holder constructed in accordance with the invention set up for use and supporting a fishing rod therein at the stern end of the boat.

Figure 2 is a fragmentary top plan view showing the holder mounted in the boat for fishing at the side thereof.

Figure 3 is a vertical central sectional view through the holder when set up for use.

Figure 4 is a bottom plan view of the holder partly in section.

Figure 5 is an end elevation partly in section.

Figure 6 is a sectional view on the line 6—6 of Figure 4.

Figure 7 is a sectional view on the line 7—7 of Figure 5.

Figure 8 is a view of the holder in collapsed condition, showing its compact form for carrying purposes.

Similar reference characters indicate corresponding parts throughout the several views in the drawings.

Referring to the drawings in detail, the rod holder comprises an angle base piece 10 providing the upstanding and lateral flanges 11 and 12 respectively, these being at right angles to each other, the flange 11 being formed with a longitudinally directed slot 13 which extends from close to one end of said flange to the center thereof and opens into a vertical branch slot 14 at the center of the flange, these slots being traversible by a slide rivet 15 carried by an adjustable upright including the sections 16 and 17 respectively. The section 16 has formed thereon attaching lugs 18, each in the form of a hook for reception in openings 19 in the section 17 so that the latter is detachably united with the section 16. The section 17 has a forked upper end 20 for the reception of a fishing rod 21, the fork being provided with a rubber edging 22 to avoid marring of the rod 21 when seated or resting therein. The flange 12 has formed therein a longitudinally directed slot 23, the same extended close from one end of said flange remote from the end of the flange 11 having the slot 13 approaching the same and this slot 23 opens into a right-angular branch slot 24 in alignment with the branch slot 14 in the flange 11. Traversing the slots 23 and 24 is a slide rivet 25 carried by a tail piece 26 which is formed with a longitudinal slot 27 centrally located therein, while this tail piece 26 at opposite long edges thereof is formed with guide tracks 28 for the slidable connection of an extension piece 29. The extension piece 29 has fitted therein a winged nut carrying bolt 30, the latter traversing the slot 27 and on the tightening of the nut upon the bolt 30 the extension 29 and tail piece 26 can be made secure to vary the extent of these joined members. In other words, the tail piece 26 with the extension 29 can be varied in length according to the length of the fishing rod 21 to be supported in the holder.

The extension 29 has connected to its outer end through the medium of a hinge 31 a two-part anchor 32, the two parts being pivoted together at 33 so that this anchor can be shortened or lengthened on the folding and unfolding of said parts. Through the medium of the hinge 31 the anchor 32 can be swung relative to the extension 29.

The extension 29 has formed thereon a tongue 34 for detachable engagement therewith of the sleeve-like foot 35 of an upright 36, the latter being disposed at a slight inclination with respect to the upright including the sections 16 and 17. The upright 36 carries at its free end a rubber lined thimble 37 in which is adapted to be inserted the handle end of the fishing rod 21, the thimble being telescoped thereonto for firmly gripping the same while the said rod 21 rests in the fork 20 of the upright including the sections 16 and 17 and in this fashion the fishing rod will be firmly held for fishing purposes.

The tail piece 26 at its inner end is formed with an upturned wing 38, while the section 16 of the upright at its inner end is formed with a claw 39 adapted to overlap the wing 38 when the tail piece and the said upright including the sections 16 and 17 are brought into registration with each other and are passed into the branch slots in the flanges 11 and 12 of the base piece so that this tail piece and upright will interlock with each other. The flange 11 of the base piece at opposite sides of the branch slot 14 therein is formed with jaws 40 into which is to be slidably fitted the section 16 of the upright having said sections 16 and 17 and thus this upright and the interlocked tail piece therewith will be held fast so that there is no possibility of the lateral swinging of these parts after the setting up of the holder for use.

The holder when set up for use is arranged in the manner as is clearly shown in Figures 1 and 2 of the drawings and in such condition it can be brought to rest on the stern end of the boat 41 or at the side thereof and in either position a clamp 42 is employed to secure the anchor 36 against a support with the base piece 10 resting upon such support and the fishing rod 21 when engaged in the holder will be firmly held in fishing position.

On detachment of the fishing rod 21 from the holder by unlatching the upright upon the base piece 10 from the tail piece 26 these parts can be folded with relation to the base piece by sliding the slide rivet in the slots 13 and 23 respectively and also the extension 29 can be moved inwardly on loosening the bolt 30 upon the tail piece 26 while the anchor can be folded, thereby shortening these parts to bring the same into compact relation and the tail piece 26 swung onto the base piece. It is of course understood that the upright 36 is detached from the extension 29 in the folding of the holder and the said upright superimposed upon the base piece in a convenient manner for compactness. In the folded condition of the holder when it is not set up for use the said holder can be stored in the least possible space or carried upon the person of the user. The anchor including the parts 32 and 33 when the holder is set up, may be inserted in the ground at a water edge so that such holder is usable for supporting a fishing rod at the water edge, thus it being obvious that the said holder is usable for the holding of a fishing rod either anchored upon a bank at the water edge or within a boat at the stern end or at either side thereof.

What is claimed is:—

1. A holder of the character described comprising a base piece, a tail piece slidably and swingingly connected to the base piece, an upright slidably and swingingly connected to the base piece and having a fishing rod rest, an extension on the tail piece, an upright detachably connected with the extension, and means for detachably coupling a fishing rod with said last named upright.

2. A holder of the character described comprising a base piece, a tail piece slidably and swingingly connected to the base piece, an upright slidably and swingingly connected to the base piece and having a fishing rod rest, an extension on the tail piece, an upright detachably connected with the extension, means for detachably coupling a fishing rod with said last named upright, and means on the first named upright and tail piece for interlocking engagement with each other.

3. A holder of the character described comprising a base piece, a tail piece slidably and swingingly connected to the base piece, an upright slidably and swingingly connected to the base piece and having a fishing rod rest, an extension on the tail piece, an upright detachably connected with the extension, means for detachably coupling a fishing rod with said last named upright, means on the first named upright and tail piece for interlocking engagement with each other, and means on the base piece for holding the upright connected therewith against sliding and swinging movement.

4. A holder of the character described comprising a base piece, a tail piece slidably and swingingly connected to the base piece, an upright slidably and swingingly connected to the base piece and having a fishing rod rest, an extension on the tail piece, an upright detachably connected with the extension, means for detachably coupling a fishing rod with said last named upright, means on the first named upright and tail piece for interlocking engagement with each other, means on the base piece for holding the upright connected therewith against sliding and swinging movement, and an anchor on the extension.

5. A holder of the character described comprising a base piece, a tail piece slidably and swingingly connected to the base piece, an upright slidably and swingingly connected to the base piece and having a fishing rod rest, an extension on the tail piece, an upright detachably connected with the extension, means for detachably coupling a fishing rod with said last named upright, means on the first named upright and tail piece for interlocking engagement with each other, means on the base piece for holding the upright connected therewith against sliding and swinging movement, an anchor on the extension, and a clamp for said anchor for clamping the latter to a support.

6. A holder of the character described comprising a base piece, a tail piece slidably and swingingly connected to the base piece, an upright slidably and swingingly connected to the base piece and having a fishing rod rest, an extension on the tail piece, an upright detachably connected with the extension, means for detachably coupling a fishing rod with said last named upright, means on the first named upright and tail piece for interlocking engagement with each other, means on the base piece for holding the upright connected therewith against sliding and swinging movement, an anchor on the extension, a clamp for said anchor for clamping the latter to a support, and means for slidably connecting the extension with the tail piece.

7. A holder of the character described comprising a base piece, a tail piece slidably and swingingly connected to the base piece, an upright slidably and swingingly connected to the base piece and having a fishing rod rest, an extension on the tail piece, an upright detachably connected with the extension, means for detachably coupling a fishing rod with said last named upright, means on the first named upright and tail piece for interlocking engagement with each other, means on the base piece for holding the upright connected therewith against sliding and swinging movement, an anchor on the extension, a clamp for said anchor for clamping the latter to a support, means for slidably connecting the extension with the tail piece, and a resilient edging in the seat of the first named upright.

In testimony whereof I affix my signature.

BENEDICT ARTHUR KABELE.